US009139377B2

(12) United States Patent
Assante et al.

(10) Patent No.: US 9,139,377 B2
(45) Date of Patent: Sep. 22, 2015

(54) METHOD AND CONTROL AND TRACKING SYSTEM OF THE CHARGE OF MATERIAL TRANSPORTED BY A CONTINUOUS SUPPLY CONVEYOR OF A METALLURGICAL FURNACE, PARTICULARLY AN ELECTRIC FURNACE FOR THE PRODUCTION OF STEEL

(75) Inventors: Francesco Alberto Maria Assante, Milan (IT); Renato Girelli, Brescia (IT); Silvio Maria Reali, Milan (IT)

(73) Assignee: TENOVA S.p.A., Milan (IT)

( * ) Notice: Subject to any disclaimer, the term of this patent is extended or adjusted under 35 U.S.C. 154(b) by 0 days.

(21) Appl. No.: 13/817,609

(22) PCT Filed: Aug. 15, 2011

(86) PCT No.: PCT/IB2011/001899

§ 371 (c)(1),
(2), (4) Date: Apr. 17, 2013

(87) PCT Pub. No.: WO2012/023029

PCT Pub. Date: Feb. 23, 2012

(65) Prior Publication Data

US 2013/0211581 A1    Aug. 15, 2013

(30) Foreign Application Priority Data

Aug. 18, 2010  (IT) .............................. MI2010A1558

(51) Int. Cl.
*G06F 7/00* (2006.01)
*B65G 43/08* (2006.01)
(Continued)

(52) U.S. Cl.
CPC ............... *B65G 43/08* (2013.01); *C21C 5/527* (2013.01); *F27B 3/18* (2013.01); *F27B 3/28* (2013.01);
(Continued)

(58) Field of Classification Search
USPC ........................................................ 700/230
See application file for complete search history.

(56) References Cited

U.S. PATENT DOCUMENTS 3,936,588 A * 2/1976 Asphaug et al. ................ 373/81
5,335,777 A * 8/1994 Murphy et al. ............ 198/502.3
(Continued)

FOREIGN PATENT DOCUMENTS

JP    52-20308    2/1977
JP    8-504734    5/1996
(Continued)

OTHER PUBLICATIONS

International Search Report Issued Feb. 1, 2012 in PCT/IB11/001899 Filed Aug. 15, 2011.
(Continued)

*Primary Examiner* — Gene Crawford
*Assistant Examiner* — Kyle Logan
(74) *Attorney, Agent, or Firm* — Oblon, McClelland, Maier & Neustadt, L.L.P.

(57) ABSTRACT

A method, control, and tracking system of a charge of material transported by a continuous supply conveyor of a metallurgical furnace, for example an electric furnace for production of steel. The continuous conveyor includes, in sequence starting from its inlet end towards its outlet end, a loading section of the charge of material to be supplied to the furnace, a preheating section of the charge of material loaded, and an introduction section into the furnace of the preheated charge of material, and along the loading section at least a first loading station of material.

9 Claims, 5 Drawing Sheets

(51) Int. Cl.
*C21C 5/52* (2006.01)
*F27B 3/18* (2006.01)
*F27B 3/28* (2006.01)
*F27D 13/00* (2006.01)
*F27D 19/00* (2006.01)
*F27D 21/00* (2006.01)

(52) U.S. Cl.
CPC .............. *F27D 13/002* (2013.01); *F27D 19/00* (2013.01); *F27D 21/0035* (2013.01); *C21C 2005/5282* (2013.01); *C21C 2005/5288* (2013.01)

(56) References Cited

U.S. PATENT DOCUMENTS

| | | | | |
|---|---|---|---|---|
| 6,004,504 | A | * | 12/1999 | Vallomy .......................... 266/79 |
| 6,450,804 | B2 | * | 9/2002 | Vallomy ....................... 432/239 |
| 2006/0250614 | A1 | * | 11/2006 | Plessers et al. ............... 356/318 |
| 2011/0282494 | A1 | * | 11/2011 | Tockert et al. ................ 700/274 |

FOREIGN PATENT DOCUMENTS

| | | |
|---|---|---|
| JP | 2002-538295 | 11/2002 |
| JP | 2010-7178 | 1/2010 |
| WO | WO 2004/065134 A | 8/2004 |

OTHER PUBLICATIONS

Office Action issued Mar. 30, 2015 in Japanese Patent Application No. 2013-524493 (with English translation).
Notice of Opposition issued Jul. 8, 2015 in European Patent Application No. 11773824.5.
W. Jansen et al., "Tracer-Based Mine-Mill Ore Tracking Via Process Hold-ups at Northparkes Mine," Tenth Mill Operators' Conference, Adelaide, SA, Oct. 12-14, 2009.
B. Kvarnstrom et al., "Sustainable Radio Frequency Identification Solutions—Chapter 5: Applications of RFID to Improve Traceability in Continuous Processes," Feb. 1, 2010, pp. 69-86.
B. Kvarnstrom, "Traceability Methods for Continuous Processes," Licentiate Thesis, Lulea University of Technology, Dept of Business Administration and Social Science-Division of Quality and Environmental Management, Sep. 2008.
Danieli Engineering Japan Co., Ltd., "Agreement of Scrap Tracking System for Tokyo Steel Manufacturing Co., Ltd.," Nov. 2009.

* cited by examiner

METHOD AND CONTROL AND TRACKING SYSTEM OF THE CHARGE OF MATERIAL TRANSPORTED BY A CONTINUOUS SUPPLY CONVEYOR OF A METALLURGICAL FURNACE, PARTICULARLY AN ELECTRIC FURNACE FOR THE PRODUCTION OF STEEL

BACKGROUND OF THE INVENTION

The present invention refers to a method and to a control and tracking system of the charge of material transported by a continuous supply conveyor of a metallurgical furnace, particularly an electric furnace for the production of steel.

The technology for producing steel through the use of electric-arc furnaces (EAF) is well established, starting from charge mixtures comprising different types of materials (iron minerals, reduced iron, scrap iron/steel etc.) in different proportions in function of the type and quality of steel that is desired to be obtained.

The supply of the charge of material to the furnace can be of the discontinuous or of the continuous type.

KR100685049, to Posco, U.S. Pat. No. 4,579,524, to GN Kinematics Corp., and EP0526664, to Sibag Schmid Industrieberatung, each describes an apparatus for supplying in a discontinuous manner the charge of material to a metallurgical furnace and a relative system for controlling the single supplied batches of charge of material.

BRIEF SUMMARY OF THE INVENTION

The present invention, on the contrary, refers to a method and to a control and tracking system of the charge of material supplied in a continuous manner to a metallurgical furnace, in particular to an electric furnace for the production of steel, through an apparatus like for example that described in U.S. Pat. No. 6,450,804, the content of which is integrally referred to hereby.

Supplying apparatuses as described for example in U.S. Pat. No. 6,450,804 comprise, in general, a continuous conveyor, for example of the vibrating or of the belt type, which extends alongside the furnace and has an inlet end and an outlet end arranged near a feeding mouth defined on one side of the furnace.

Along the continuous conveyor in sequence starting from its inlet end towards its outlet end, a loading section of the charge of material to be supplied to the furnace, a preheating section of the charge of material loaded and a section for introducing the preheated charge of material into the furnace are defined.

At the loading section, the charge of material to be treated is deposited onto the continuous conveyor through appropriate manipulation devices, of the crane type or manipulator arms type.

The preheating section consists instead of a closed tunnel inside which the charge of material is indeed preheated through appropriate burners and/or by the heat directly or indirectly recovered from the fumes exiting from the furnace.

The introduction section of the charge preheated inside the furnace comprises a device for connecting the continuous conveyor with the furnace, device that is associated in a mobile manner to the feeding mouth of the furnace.

The technologies for producing steel, in general, and those with continuous supply of the charge of material, in particular, provide the maintenance of a predetermined minimum level of liquid metal in the crucible of the furnace to which the charge of material transported by the continuous conveyor is supplied.

In such a context, the need of being able to verify the yield of every single charge of material and to optimise the composition of the charge of material in function of the quality of steel which is desired to be obtained is particularly felt.

From U.S. Pat. No. 5,948,137, to David J. Joseph Company, a system for determining the weight and for analysing the composition of a charge of material continuously supplied to a metallurgical furnace is known, wherein the analysis of the composition is carried out through an analysing device of the so-called "Prompt Gamma-Ray Neutron Activation Analysis" (PGNAA) type. Such a system, however, is difficult to be implemented at the industrial level, both due to the complexity and to the installation and management costs of such an analysis device, and due to the poor safety conditions of a metallurgical site wherein such an analysis device should operate.

From U.S. Pat. No. 6,004,504, to Techint Compagnia Tecnica Internazionale, a method and an apparatus are known for controlling a process for producing steel continuously, wherein in proximity to the inlet of the preheating section, means for detecting the weight and the advancement speed of the charge of material previously supplied on the continuous conveyor along the corresponding loading section, are arranged. The detected weight and speed of the load are used to extrapolate the flow-rate of the charge supplied to the furnace and, also in function of the signals detected by thermal and level probes inserted in the furnace, to estimate the bath level in the furnace.

A method and a control apparatus as described in U.S. Pat. No. 6,004,504, however, do not permit to find out the typology (quality/composition) of the charge of material progressively supplied to the furnace and, therefore, to evaluate the respective yield and to consequently intervene on the recipe of melt in function of the quality of steel which is desired to be obtained.

The purpose of the present invention is that of providing a method and a control and tracking system of the charge of material transported by a continuous supply conveyor of a metallurgical furnace, particularly an electric furnace for the production of steel, which permit to avoid the aforementioned drawbacks of the prior art.

In the field of such a general purpose, one purpose of the present invention is that of providing a method and a control and tracking system of the charge of material transported by a continuous supply conveyor of a metallurgical furnace, particularly an electric furnace for the production of steel, which permit to estimate with sufficient precision, in terms of quality (type) and of quantity, the charge of material supplied to a metallurgical furnace and the time in which it is introduced into the furnace itself.

Another purpose of the present invention is that of providing a method and a control and tracking system of the charge of material transported by a continuous supply conveyor of a metallurgical furnace, particularly an electric furnace for the production of steel, which permit to estimate the yield of each charge of material and to manage, in a flexible manner, the loading of different qualities (types) and quantities of charge material in function of the recipe of melt and of the quality of steel that is desired to be obtained.

These purposes according to the present invention are achieved by realizing a control and tracking method of the charge of material transported by a continuous supply conveyor of a metallurgical furnace, particularly an electric furnace for the production of steel, comprising a) determining a type and weight of the material of a first charge fraction to be loaded in the first loading station in function of a predetermined charge recipe;
b) supplying the first loading station with the first charge fraction;
c) detecting a weight of the first charge fraction;
d) discharging the first charge fraction on the continuous conveyor;
e) marking the first charge fraction through identification means;
f) detecting overall dimensions of the first charge fraction discharged on the continuous conveyor;
g) estimating an advancing speed of the first charge fraction along the loading section of the continuous conveyor and an arrival time of the first charge fraction entering a possibly subsequent loading station of a further charge fraction or the preheating section;
h) in proximity to the inlet to the preheating section, recognizing in the charge of material discharged onto the continuous conveyor, the first charge fraction and possible further charge fractions subsequently discharged onto the continuous conveyor by the respective identification means;
i) estimating an advancing speed of the first charge fraction and of possible further charge fractions subsequently discharged onto the continuous conveyor along the preheating section and the respective arrival time at the inlet section into the furnace.

These purposes are moreover achieved through a control and tracking system of the charge of material transported by a continuous supply conveyor of a metallurgical furnace, particularly an electric furnace for the production of steel, wherein the continuous conveyor includes, in sequence starting from its inlet end towards its outlet end, a loading section of the charge of material to be supplied to the furnace, a preheating section of the charge of material loaded, and an introduction section into the furnace of the preheated charge of material, and along the loading section at least a first loading station of the material, the system comprising:

at the first loading station, at least one loading hopper referring to the continuous conveyor, means for detecting a weight of the material loaded in the hopper, means for marking a first charge fraction supplied into the hopper through identification means, means for detecting overall dimensions of the first charge fraction discharged onto the continuous conveyor, and means for detecting an advancing speed of the first charge fraction along the loading section of the continuous conveyor; and in proximity to the inlet to the preheating section, means for recognizing in the charge of material discharged onto the continuous conveyor of the first charge fraction and of possible further charge fractions subsequently discharged onto the continuous conveyor by the respective identifying means;

a processing and control unit configured to determine a type and weight of the material of at least one first charge fraction to be loaded into the hopper of the first loading station in function of a predetermined charge recipe and to process the data detected by the means for detecting the weight, the overall dimensions and the speed and by the recognizing means, to estimate an actual position, an advancing speed along the loading section, and an arrival time of the first charge fraction entering a further possible loading station of a further charge fraction or the preheating section and the actual position, the advancing speed along the preheating section and the arrival time to the introducing section into the furnace of the first charge fraction and of possible further charge fractions subsequently discharged onto the continuous conveyor.

The characteristics and the advantages of a method and of a control and tracking system of the charge of material transported by a continuous supply conveyor of a metallurgical furnace, particularly an electric furnace for the production of steel, according to the present invention will become clearer from the following description, exemplifying and not limiting, with reference to the attached schematic drawings, wherein:

DETAILED DESCRIPTION OF THE PREFERRED EMBODIMENTS

Figure 1:
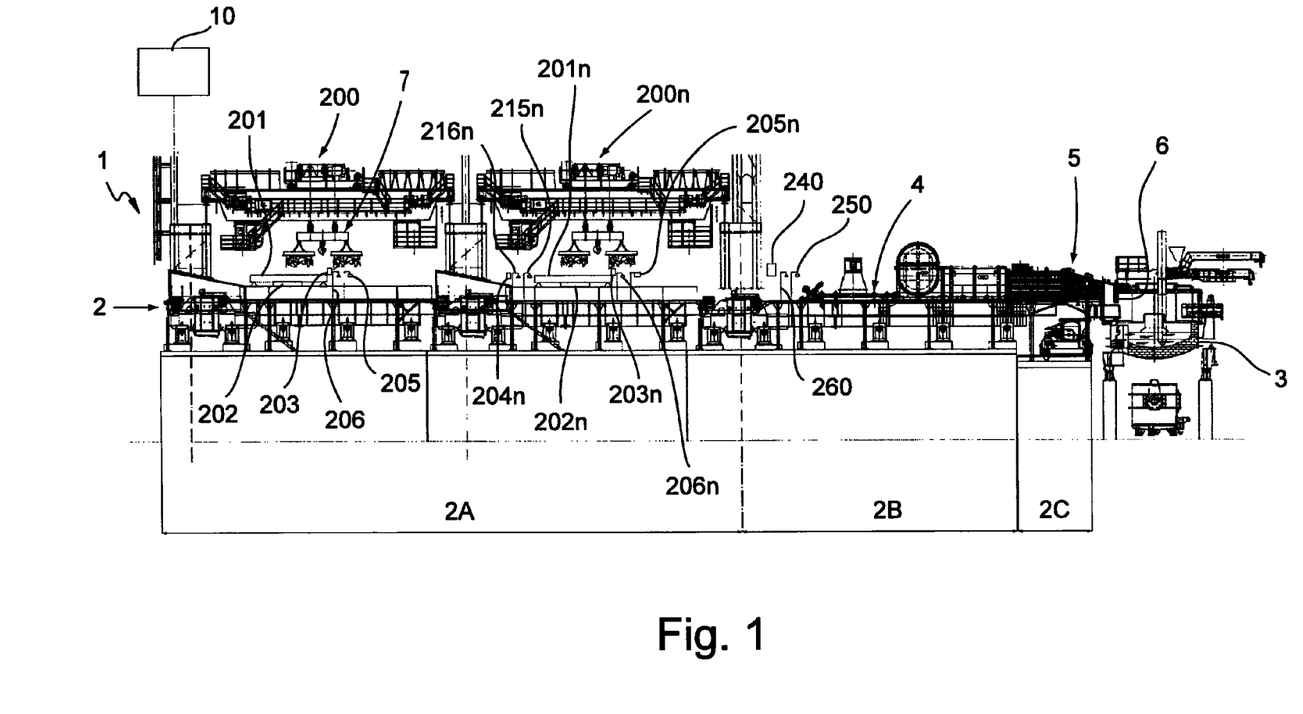
FIG. 1 is a schematic side view of a system according to the present invention applied to a continuous supply conveyor of an electric-arc furnace.

With reference to the figures, a control and tracking system 1 of the charge of material transported by a continuous conveyor 2 for supplying a metallurgical furnace 3 is shown, particularly an electric furnace for the production of steel.

The furnace 3 is, preferably, but not exclusively, of the electric-arc type, but it can also be of the induction or plasma type.

The conveyor 2 is, preferably, but not exclusively, of the vibrating type, but it could also be of the belt type or similar.

The conveyor 2 comprises, in sequence starting from its inlet end towards its outlet end, a loading section 2A of the charge of material to be supplied to the furnace 3, a preheating section 2B of the charge of material loaded and an introduction section 2C into the furnace 3 of the preheated charge of material.

Along the loading section 2A at least a first loading station 200 of the material is present, followed by one or more subsequent n-th loading stations 200n.

Downstream of the loading section 2A the preheating section 2B is present, which typically consists of a closed tunnel 4 wherein the charge of material is preheated by the heat generated by appropriate burners and/or directly or indirectly recovered from the fumes exiting from the furnace 3.

The outlet of the preheating section 2B is associated with the introduction section 2C which typically comprises a device 5 for connecting to a feeding mouth 6 obtained on one side of the furnace 3.

The conveyor 2, the furnace 3, the loading 2A, the preheating 2B and the introduction 2C sections are not further described in detail being of the known type, as for example described in U.S. Pat. No. 6,450,804, the content of which is hereby integrally incorporated.

At the first loading station 200 and at each subsequent n-th loading station 200n a respective loading hopper 201, 201n is present, of the fixed or mobile type, belonging to the conveyor 2.

The first hopper 201 and each n-th subsequent hopper 201n are associated with respective detecting means of the weight 202, 202n of the material therein loaded by loading apparatuses which a steelwork plant is usually equipped with, for example of the type with a crane hoist 7.

The detecting means of the weight 202, 202n consist, for example, of sensors, load cells and similar.

At the first hopper 201 and at each n-th subsequent hopper 201n, moreover, marking means 203, 203n are provided respectively of the first charge fraction C1 and of each subsequent n-th charge fraction Cn respectively discharged by them onto the conveyor 2 through identification means M1, Mn.

The identification means M1, Mn, for example, can consist of an electromagnetic radiation emitter and, in case each charge fraction consists in its turn of a plurality of different materials, each one can be marked with respective identification means M1, M1', M1", M1''' and Mn, Mn', Mn", Mn''' etc.

At the inlet of each n-th loading station 200n respective recognising means 204n are provided, through the respective identification means M1, Mn, of the (n−1) charge fractions discharged in the preceding loading stations and present in the load of material entering them.

Analogous recognising means 240 are present at the inlet of the preheating section 2B.

In case the identification means M1, Mn are of the electromagnetic radiation emitter type, the recognising means 204n and 240 are of the receiver type.

However, different identification and recognition means are not excluded, for example, based upon the application to the different charge fractions or to the different materials forming each charge fraction of an appropriate paint.

Downstream, with respect to the advancement direction of the conveyor 2, of the first hopper 201 and of each subsequent n-th hopper 201n means for detecting the overall dimensions 205, 205n are arranged respectively of the first charge fraction C1 and of each subsequent n-th charge fraction, i.e. of the charge exiting from the n-th loading station 200n, present on the conveyor 2.

Analogous means for detecting the overall dimensions 215n and 250 are arranged at the inlet of each n-th loading station 200n and of the preheating section 2B.

The means for detecting the overall dimensions 205, 205n, 215n and 250 comprise means for acquiring the profile respectively of the first charge fraction C1 exiting from the first loading station 200, of the charge exiting from each subsequent n-th loading station 200n and of the charge entering the n-th loading station 200n and of the preheating section 2B on at least one plane transversal to the advancing direction of the conveyor 2.

In a preferred embodiment, such means for acquiring the profile of the charges of material present on the conveyor 2 are of the radar scanning type. However, alternative embodiments of the optical, of the laser scanning type or other, for example, are not excluded.

Downstream, with respect to the advancing direction of the conveyor 2, of the first hopper 201 and of each subsequent n-th hopper 201n means 206, 206n are arranged for detecting the advancing speed respectively of the first charge fraction C1 and of each subsequent n-th charge fraction Cn, that is of the charge of material exiting from the n-th loading station 200n, along the loading section 2A of the conveyor 2.

Analogous means for detecting 216n, 260 the advancing speed of the charge are arranged at the inlet of each n-th loading station 200n and of the preheating section 2B.

In a preferred embodiment, the means for detecting 206, 206n, 216n and 260 the advancing speed respectively of the first charge fraction C1, of the charge exiting from the n-th loading station 200n, of the charge entering the n-th loading station 200n and of the charge entering the preheating section 2B comprise means for acquiring a plurality of images of the respective charges in delayed times, the images and the relative acquisition times being then mutually correlated and processed through appropriate composition and processing algorithms to obtain therefrom an estimate of the advancing speed of the respective charge of material.

However, different embodiments of the means for detecting the speed of the charges of material of the type, for example, of radiation, laser devices or other are not excluded.

In case the means for detecting the advancing speed of the charges of material are of the type based upon the acquisition of a series of subsequent images of the charges of material themselves, such images can be used and processed also in order to get information pertaining to the size and to the overall dimensions thereof, of the fractions that form them or of the different materials that form each fraction.

Moreover, the possibility is not excluded that the means for detecting the overall dimensions of the charges of material may actually coincide with the means for detecting the advancing speed of the same charges of material, in case the latter are based upon the acquisition of a series of successive images of the charges themselves.

The system 1 also comprises a processing and control unit 10 that receives at the inlet the detected data and the signals transmitted by each of the means for detecting the weight 202, 202n, the marking means 203, 203n, the recognising means 204n, 240, the means for detecting the overall dimensions 205, 205n, 215n and 250 and the means for detecting the speed 206, 206n, 216n and 260.

The processing and control unit 10 moreover receives at the inlet the signal transmitted by means for detecting the weight of the molten metal tapped from the furnace 3, which are associated with the ladle for collecting the tapped melt metal and not shown in detail, or by systems for weighing the furnace, through the difference of quantity tapped as for example described in EP1872074.

The processing and control unit 10, moreover, is associated with memory means containing an archive of recipes of melt and with means for controlling and driving the loading devices (crane hoist 7) operating in a store of charge materials, not shown.

Figure 2:
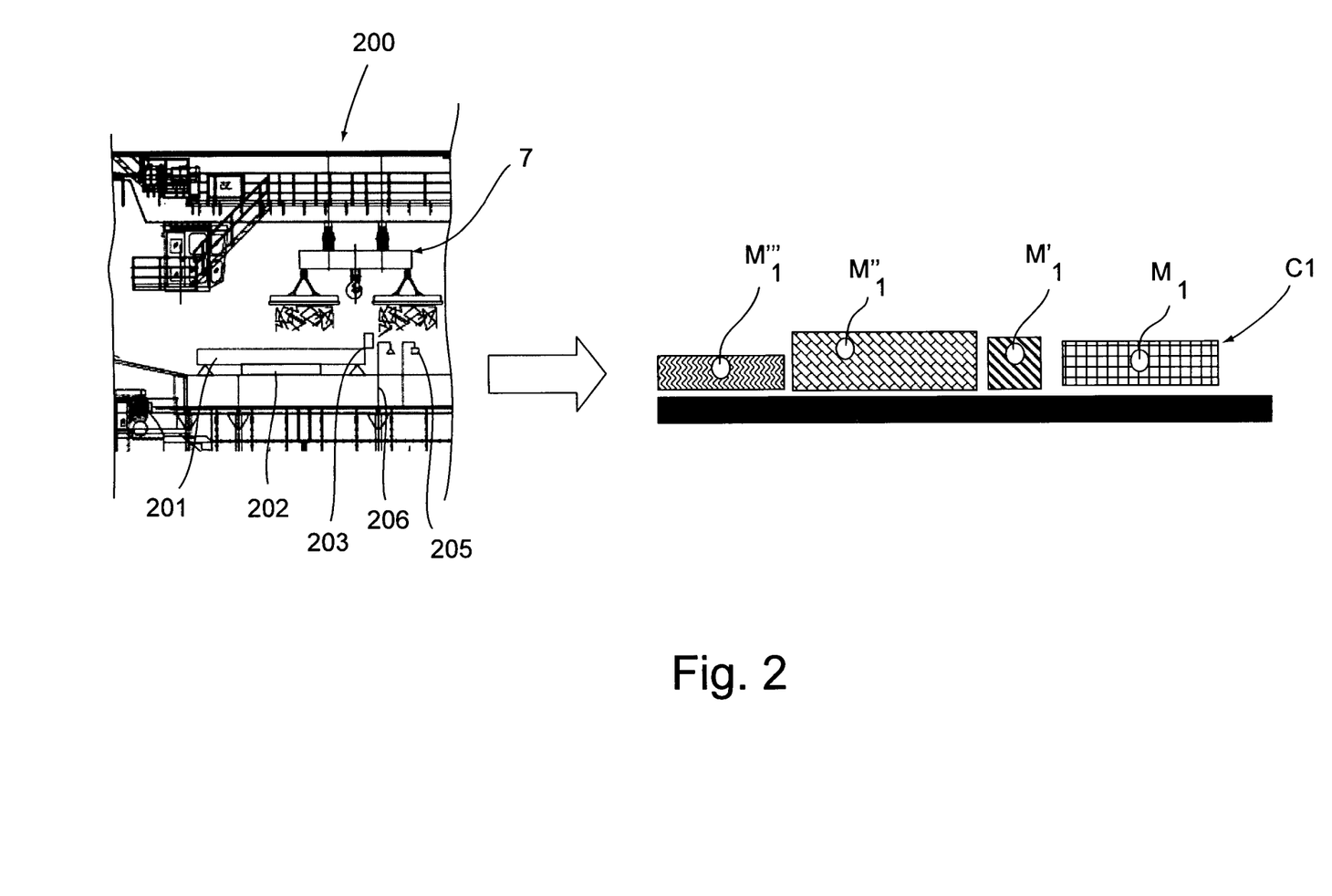
FIGS. 2, 3 and 4 schematically show subsequent loading steps onto the continuous conveyor of different charge fractions at as many different loading stations.
Figure 3:
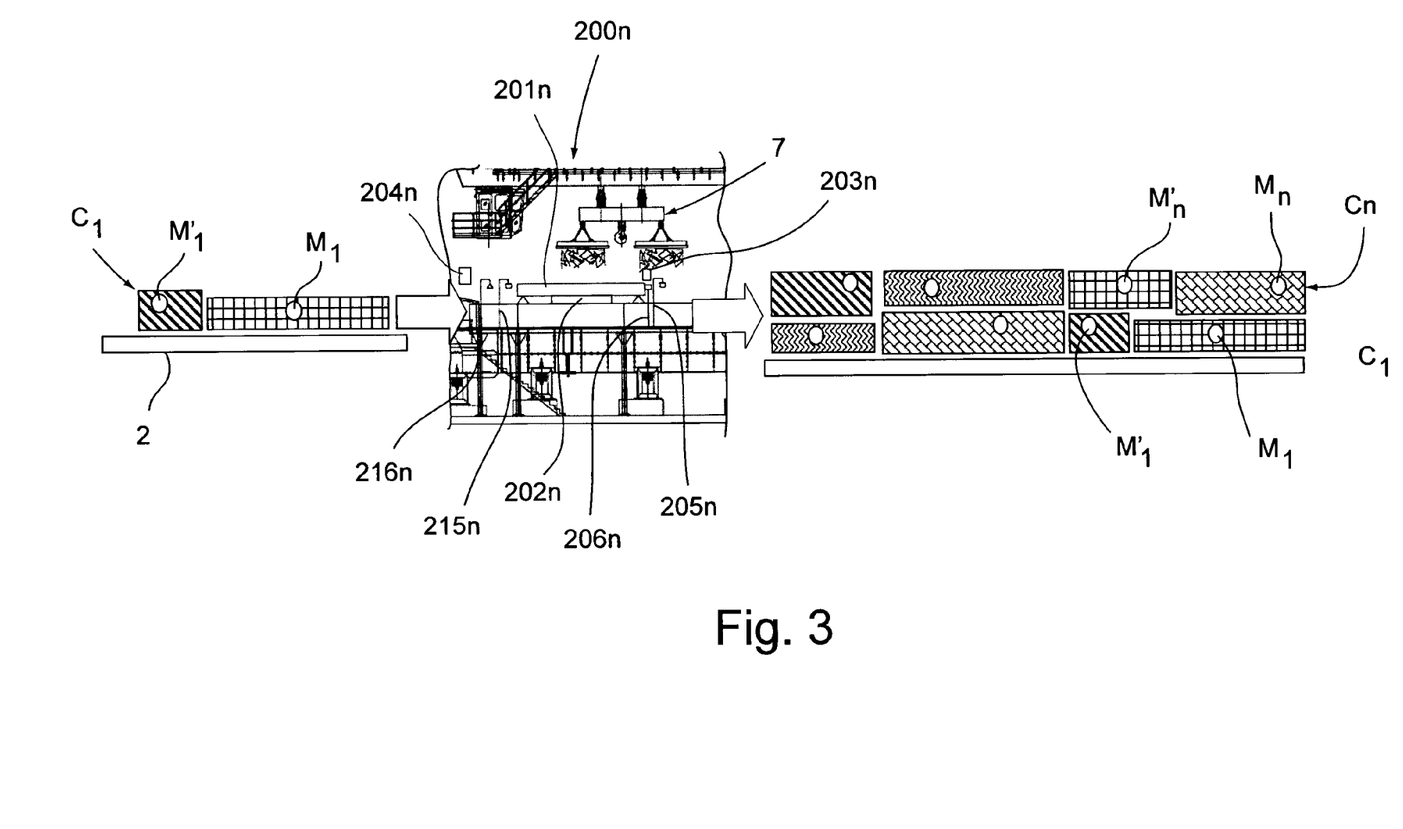
Figure 4:
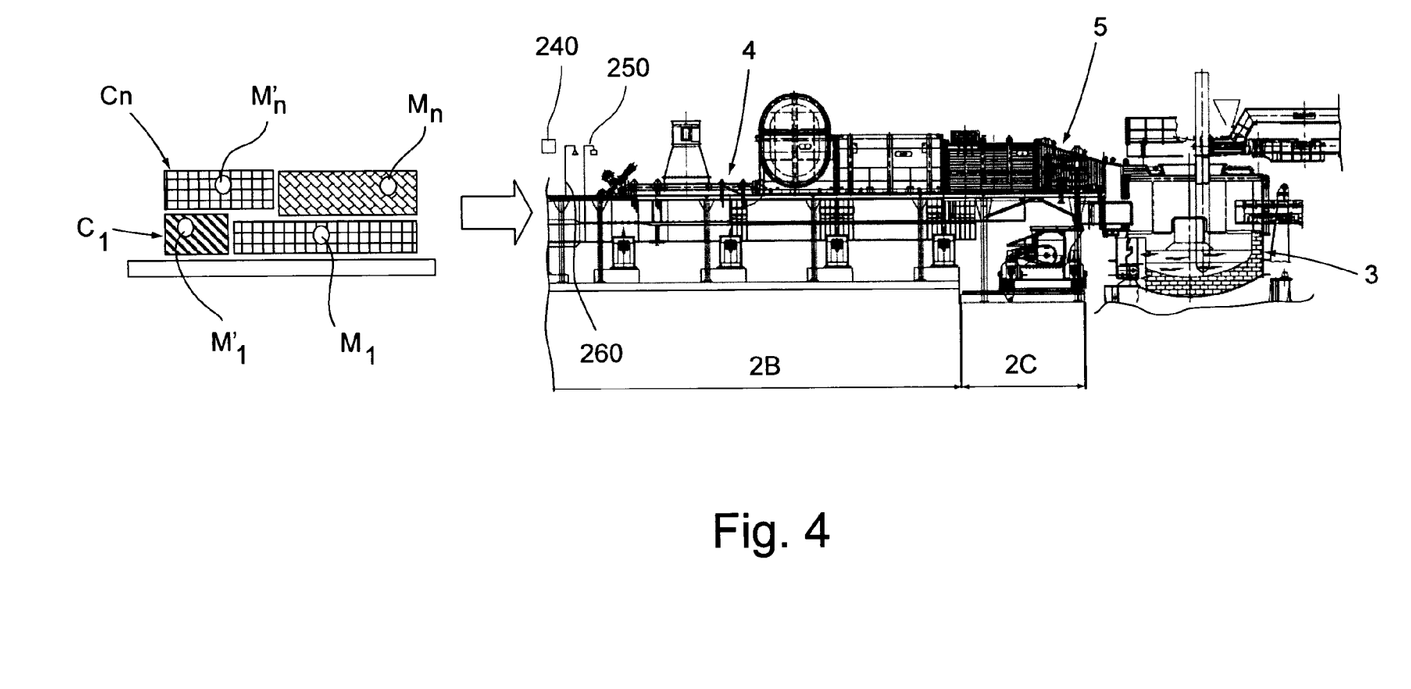
Figure 5:
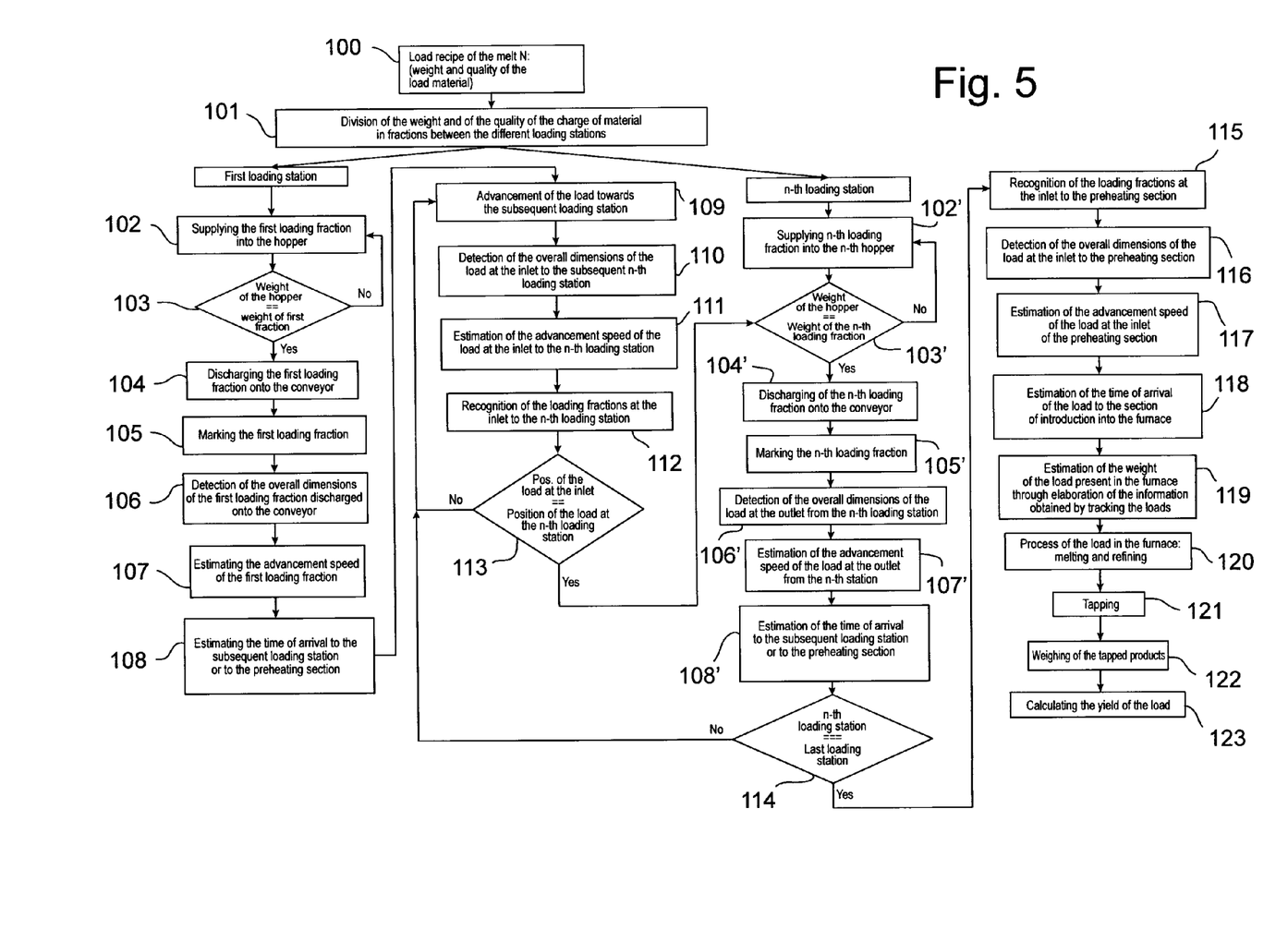
FIG. 5 is a block diagram of the method according to the present invention.

With particular reference to the block diagram of FIG. 5 and to the sequence of steps illustrated in FIGS. 2-4, the method according to the present invention implemented by a system as described above is now illustrated.

Once a predetermined charge recipe has been set for the n-th melt of metal to be obtained (step 100 of the diagram), the processing and control unit 10 determines (steps a) and a'); step 101 of the diagram) the typology and the weight of material of a first charge fraction C1 and of each possible subsequent n-th charge fraction Cn to be loaded respectively into the first loading station 200 and into the possible subsequent n-th loading stations 200n for obtaining the predetermined recipe.

On the basis of the division, in terms of quality and quantity, of the charge material in different charge fractions C1-Cn thus established, the loading devices (crane hoist 7) supply the first hopper 201 of the first loading station 200 with the first charge fraction (step b); step 102 of the diagram), of which, the means for detecting the weight 202 detect the actual weight (step c).

When the detected actual weight reaches the value determined in step a) (step 103 of the diagram), the first charge fraction C1 is discharged onto the conveyor 2 (step d); step 104 of the diagram).

The marking means 203 associate, with the first charge fraction C1, the respective identification means M1 (step e); step 105 of the diagram) or M1, M1', M1" and M1''' in case, for example, the first charge fraction C1 comprises a plurality of different materials.

The means for detecting the overall dimensions 205 then detect the two- or three-dimensional overall dimensions of the first charge fraction C1 in outlet from the first charge station 200 (step f); step 106 of the diagram) and the detecting means of the speed 206 detect or permit to estimate (step g); step 107 of the diagram) the advancing speed of the first charge fraction C1 along the loading section 2A of the conveyor 2 and the arrival time (step g); step 108 of the diagram) of the same entering a possible subsequent n-th loading station 200$n$ of a further n-th charge fraction Cn or to the preheating section 2B.

The estimate of the arrival time of the first charge fraction C1 to the possible subsequent n-th loading station 200$n$ or entering the preheating section 2B occurs through the processing of the estimated speed and of the length of the conveyor 2, that is of the distance between the first loading station 200 and the n-th loading station 200$n$ and the inlet of the preheating section 2B.

In case a further n-th loading station 200$n$ is present, where $n \geq 2$, the first charge fraction or the (n−1) charge fraction discharged onto the conveyor 2 advances towards it (step 109 of the diagram).

At the inlet of the n-th loading station 200$n$ the (n−1) charge fractions discharged into the preceding loading stations are identified by the recognising means 204$n$ through the respective identification means M1, Mn (step I); step 112 of the diagram).

Always at the inlet of the n-th loading station 200$n$, the means for detecting the overall dimensions 215$n$ detect the overall actual dimensions of the charge of material entering it (step II); step 110 of the diagram).

Afterwards, the position is estimated, with respect to the charge entering the n-th loading station 200$n$, at which to perform the discharge of the n-th charge fraction Cn in function of the actual overall dimensions of the charge of material entering the n-th loading station 200$n$ and of the distribution of the (n−1) charge fractions previously discharged onto the conveyor 2 (step III).

Always at the inlet to the n-th loading station 200$n$, the means for detecting the speed 216$n$ detect or permit to estimate the advancing speed of the charge entering the n-th loading station 200$n$ along the loading section 2A and the arrival time of the discharge position estimated at the n-th loading station 200$n$ (step IV; step 111 of the diagram).

When the position of the charge of material entering the n-th loading station corresponds to the estimated position, the n-th charge fraction Cn is discharged onto the conveyor 2 (step V); step 113 of the diagram).

For each n-th loading station 200$n$, in an analogous way to the first loading station 200, on the basis of the division, in terms of quality and quantity, of the charge material in different charge fractions C1-Cn established by the processing and control unit 10, the loading devices (crane hoist 7) supply the n-th hopper 201$n$ of the n-th loading station 200$n$ with the n-th charge fraction Cn (step b'); step 102' of the diagram), of which, the means for detecting the weight 202$n$ detect the actual weight (step c').

When the detected actual weight reaches the value determined in step a') (step 103' of the diagram), the n-th charge fraction Cn is discharged onto the conveyor 2 (step d'); step 104' of the diagram).

The marking means 203$n$ associate the respective identification means Mn (step e'); step 105' of the diagram) with the n-th charge fraction Cn.

The means for detecting the overall dimensions 205$n$ then detect the two- or three-dimensional overall dimensions of the n-th charge fraction Cn, that is, of the charge of material exiting from the n-th loading station 200$n$ (step f'); step 106' of the diagram) and the means for detecting the speed 206$n$ detect or permit to estimate (step g'); step 107' of the diagram) the advancing speed of the n-th charge fraction Cn, that is, of the charge exiting from the n-th loading station 200$n$ along the loading section 2A of the conveyor 2 and the arrival time (step g'); step 108' of the diagram) of the same entering a possible subsequent loading station 200$n$+1 of a further charge fraction Cn+1 or the preheating section 2B.

Exiting from the last loading station (step 114 of the diagram), the charge of material consisting of the various charge fractions C1, C2 . . . Cn, of each of which, on the basis of the data detected and estimated, the type (quality), the weight, the position and the actual speed and the relative overall dimensions are known, comes to enter the preheating section 2B.

Here the recognising means 240 recognise in the discharged charge of material the first charge fraction C1 and possible further charge fractions Cn subsequently discharged onto the conveyor 2 by means of respective identification means M1, Mn (step h); step 115 of the diagram).

Always at the inlet to the preheating section 2B, the relative means for detecting the overall dimensions 250 detect the actual overall dimensions of the charge of material comprising the first charge fraction C1 and possible further charge fractions Cn subsequently discharged onto the conveyor 2 (step i); step 116 of the diagram).

In the same way, the means for detecting the speed 260 detect or permit to estimate the advancing speed of the first charge fraction C1 and of possible further charge fractions Cn subsequently discharged onto the conveyor 2 along the preheating section 2B and the relative arrival time to the introduction section into the furnace 2C (step l); steps 117 and 118 of the diagram).

Even in such case, the arrival time of the charge or of the different charge fractions to the introduction section 2C into the furnace 3 is estimated on the basis of the data of the speed of the charge fractions previously processed and of the length of the conveyor 2.

On the basis of the data pertaining to the type (quality), the weight, the actual position, the advancing speed and the overall dimensions of the single charge fractions, it is possible to estimate the weight and the typology of the charge actually introduced into and present in the furnace 3 (step m); step 119 of the diagram).

The data pertaining to the type (quality), the weight and the overall dimensions of the single fractions also permit to estimate the average density of each of them.

At the end of the melting and refining treatment (step 120 of the diagram) and of the tapping of the melt metal (step 121 of the diagram), means for detecting the weight associated with the ladle for collecting the melt metal or to the melting furnace, acquire, directly or indirectly by subtraction, the weight of the tapped melt metal (step n); step 122 of the diagram).

Such data is processed by the processing and control unit 10 for estimating the yield of the treated charge (step o); step 123 of the diagram) thus creating a record on the basis of which it is possible to optimise the formulation of the melt recipes in function of the quality of steel being produced.

Then the recipe of the subsequent melt is determined.

It is specified that the time sequence of the steps could be different from that described; for example, the marking of the single charge fractions could occur before they are discharged onto the conveyor 2, the detection of the overall dimensions can occur before or after the detection of the speed, these last detections (of the overall dimensions and of the speed), moreover, can be based upon a common series of successive images of the charge of material in successive instants of time.

Moreover, the various steps of the method according to the present invention occur in real time with the continuous supply process of the charge of material in the furnace.

The method and the system according to the present invention permit to know the typology (quality) and the weight of the charge fraction discharged onto the continuous conveyor at each loading station and to determine, at any instant of time, its position, its overall dimensions and its advancing speed along the loading section and also along the preheating section of the conveyor itself, thus keeping track of it.

On the basis of such information, the method and the system according to the present invention permit, in particular, to estimate the typology (quality) and the weight of the charge of material introduced into and processed in the furnace in a determined time interval, thus being able to estimate the yield.

The method and the system according to the present invention, thanks to the fact that they permit to know, at any instant of time, the position, the weight, the overall dimensions and the advancing speed of a specific charge fraction of a known type (quality), being the same "marked" and "monitored" in its course along the continuous conveyor, permit to define, modify and program the melt recipes in a flexible manner in function of the different qualities of metal which are desired to be produced. This also occurs during the advancing of the charge along the conveyor itself, modifying, for example, the charge fraction of a determined loading station or the process in the furnace.

The detection of the overall dimensions of the charge of material entering and exiting from each loading station and of the weight of the single charge fractions permit to evaluate the choice and the positioning of the subsequent charge of material for a better distribution of the same, both in the horizontal and in the vertical direction along the continuous conveyor, in terms of quality, weight and size as well.

The marking of each single charge fraction and/or of the components and the recognition thereof along the entire continuous conveyor, along with the detection or estimate of its advancing speed along the continuous conveyor, permit to know its actual position and its advancing state towards the furnace and to determine the typology and the weight of the charge processed in a determined time interval inside the furnace.

The method and the system thus conceived can undergo numerous modifications and variants, all covered by the invention; moreover, all details are replaceable with technically equivalent elements. In practice the materials used, as well as the sizes, could be any according to the technical needs.

The invention claimed is:

1. A control and tracking method of a charge of material transported by a continuous supply conveyor of a metallurgical furnace, or an electric furnace for production of steel, wherein the continuous conveyor includes, in sequence and starting from its inlet end towards its outlet end, a loading section of the charge of material to be supplied to the furnace, a preheating section of the charge of material loaded, and an introduction section into the furnace of the preheated charge of material, and along the loading section at least a first loading station of material, the method comprising:

a) determining a type and weight of the material of a first charge fraction to be loaded in the first loading station in function of a predetermined charge recipe;

b) supplying the first loading station with the first charge fraction;

c) detecting a weight of the first charge fraction;

d) discharging the first charge fraction on the continuous conveyor;

e) marking the first charge fraction through identification means;

f) detecting overall dimensions of the first charge fraction discharged on the continuous conveyor;

g) estimating an advancing speed of the first charge fraction along the loading section of the continuous conveyor and an arrival time of the first charge fraction entering a possibly subsequent loading station of a further charge fraction or the preheating section;

h) in proximity to the inlet to the preheating section, recognizing in the charge of material discharged onto the continuous conveyor, the first charge fraction and possible further charge fractions subsequently discharged onto the continuous conveyor by the respective identification means;

i) estimating an advancing speed of the first charge fraction and of possible further charge fractions subsequently discharged onto the continuous conveyor along the preheating section and the respective arrival time at the inlet section into the furnace, wherein along the loading section at least a n-th loading station subsequent to the loading station is present, where n>2, the method further comprising:

a') determining a type and weight of material of the n-th charge fraction to be loaded in the n-th loading station in function of the predetermined charge recipe;

b') supplying the n-th loading station with the n-th charge fraction;

c') determining a weight of the n-th charge fraction;

d') discharging the n-th charge fraction onto the continuous conveyor;

e') marking the n-th charge fraction through respective identification means;

f') detecting overall dimensions of the charge of material discharged onto the continuous conveyor and exiting from the n-th loading station;

g') estimating an advancing speed of the charge of material discharged onto the continuous conveyor and exiting from the n-th loading station along the loading section and an arrival time of the charge of material exiting from the n-th loading station entering a possible subsequent loading station of a further charge fraction or to the preheating section, wherein prior to the discharge d'), the method further comprising:

I) recognizing in the charge of material entering the n-th loading station the n−1 charge fractions discharged in the preceding loading stations by the respective identification means;

II) detecting the actual overall dimensions of the charge of material entering the n-th loading station;

III) estimating with respect to the charge entering the n-th loading station the position at which performing the discharge of the n-th charge fraction, in function of the actual overall dimensions of the charge of material entering the n-th loading station and of the distribution of the charge fractions previously discharged on the continuous conveyor;

IV) estimating the advancing speed of the charge of material entering the n-th loading station along the loading section and the arrival time of the estimated discharge position to the n-th loading station;

V) verifying the correspondence between the discharge position with the n-th loading station, wherein the detecting f) of the overall dimensions of the first charge fraction, of the charge entering II) and exiting from the n-th loading station f') and of the charge entering the preheating section i) comprises acquisition of a profile of the charges at least on a plane transversal to the advancing direction of the continuous conveyor.

2. A control and tracking method of a charge of material transported by a continuous supply conveyor of a metallurgical furnace, or an electric furnace for production of steel, wherein the continuous conveyor includes, in sequence and starting from its inlet end towards its outlet end, a loading section of the charge of material to be supplied to the furnace, a preheating section of the charge of material loaded, and an introduction section into the furnace of the preheated charge of material, and along the loading section at least a first loading station of material, the method comprising:

a) determining a type and weight of the material of a first charge fraction to be loaded in the first loading station in function of a predetermined charge recipe;

b) supplying the first loading station with the first charge fraction;

c) detecting a weight of the first charge fraction;

d) discharging the first charge fraction on the continuous conveyor;

e) marking the first charge fraction through identification means;

f) detecting overall dimensions of the first charge fraction discharged on the continuous conveyor;

g) estimating an advancing speed of the first charge fraction along the loading section of the continuous conveyor and an arrival time of the first charge fraction entering a possibly subsequent loading station of a further charge fraction or the preheating section;

h) in proximity to the inlet to the preheating section, recognizing in the charge of material discharged onto the continuous conveyor, the first charge fraction and possible further charge fractions subsequently discharged onto the continuous conveyor by the respective identification means;

i) estimating an advancing speed of the first charge fraction and of possible further charge fractions subsequently discharged onto the continuous conveyor along the preheating section and the respective arrival time at the inlet section into the furnace, wherein along the loading section at least a n-th loading station subsequent to the loading station is present, where n>2, the method further comprising:

a') determining a type and weight of material of the n-th charge fraction to be loaded in the n-th loading station in function of the predetermined charge recipe;

b') supplying the n-th loading station with the n-th charge fraction;

c') determining a weight of the n-th charge fraction;

d') discharging the n-th charge fraction onto the continuous conveyor;

e') marking the n-th charge fraction through respective identification means;

f') detecting overall dimensions of the charge of material discharged onto the continuous conveyor and exiting from the n-th loading station;

g') estimating an advancing speed of the charge of material discharged onto the continuous conveyor and exiting from the n-th loading station along the loading section and an arrival time of the charge of material exiting from the n-th loading station entering a possible subsequent loading station of a further charge fraction or to the preheating section, wherein prior to the discharge d'), the method further comprising:

I) recognizing in the charge of material entering the n-th loading station the n−1 charge fractions discharged in the preceding loading stations by the respective identification means;

II) detecting the actual overall dimensions of the charge of material entering the n-th loading station;

III) estimating with respect to the charge entering the n-th loading station the position at which performing the discharge of the n-th charge fraction, in function of the actual overall dimensions of the charge of material entering the n-th loading station and of the distribution of the charge fractions previously discharged on the continuous conveyor;

IV) estimating the advancing speed of the charge of material entering the n-th loading station along the loading section and the arrival time of the estimated discharge position to the n-th loading station;

V) verifying the correspondence between the discharge position with the n-th loading station, wherein the estimating of the advancing speed of the first charge fraction g), of the charge entering IV) and exiting g') from the n-th loading station along the loading section and of the charge of material advancing along the preheating section i) comprises acquiring a series of subsequent images of the charges exiting from the first loading station, entering and exiting from the n-th loading stations and entering the preheating section in delayed times and correlating and processing the acquired images and time data for obtaining an estimate of the advancing speed.

3. A control and tracking system of a charge of material transported by a continuous supply conveyor of a metallurgic furnace, or an electric furnace for production of steel, wherein the continuous conveyor includes, in sequence starting from its inlet end towards its outlet end, a loading section of the charge of material to be supplied to the furnace, a preheating section of the charge of material loaded, and an introduction section into the furnace of the preheated charge of material, and along the loading section at least a first loading station of the material, the system comprising:

at the first loading station, at least one loading hopper referring to the continuous conveyor, means for detecting a weight of the material loaded in the hopper, means for marking a first charge fraction supplied into the hopper through identification means, means for detecting overall dimensions of the first charge fraction discharged onto the continuous conveyor, and means for detecting an advancing speed of the first charge fraction along the loading section of the continuous conveyor; and in proximity to the inlet to the preheating section, means for recognizing in the charge of material discharged onto the continuous conveyor of the first charge fraction and of possible further charge fractions subsequently discharged onto the continuous conveyor by the respective identifying means;

a processing and control unit configured to determine a type and weight of the material of at least one first charge fraction to be loaded into the hopper of the first loading station in function of a predetermined charge recipe and to process the data detected by the means for detecting the weight, the overall dimensions and the speed and by the recognizing means, to estimate an actual position, an advancing speed along the loading section, and an arrival time of the first charge fraction entering a further possible loading station of a further charge fraction or the preheating section and the actual position, the advancing speed along the preheating section and the arrival time to the introducing section into the furnace of the first charge fraction and of possible further charge fractions subsequently discharged onto the continuous conveyor, further comprising means for detecting the overall dimensions and means for detecting the speed, comprising means for acquiring images, or optical scanning means, radar, laser, of the charge of material present on the continuous conveyor.

4. The system according to claim 3, further comprising, at the inlet of each n-th loading station, means for detecting the actual overall dimensions of the charge of material comprising the first charge fraction and possible further charge fractions subsequently discharged onto the continuous conveyor, and means for detecting the advancing speed of the first charge fraction and of possible further charge fractions subsequently discharged onto the continuous conveyor.

5. The system according to claim 3, wherein along the loading section at least a n-th loading station is present subsequent to the first loading station, wherein n≥2, the system further comprising:
   at least a n-th loading hopper referring to the continuous conveyor at the n-th loading station;
   means for detecting a weight of the material loaded in the n-th hopper, means for marking the n-th charge fraction supplied into the n-th hopper by associating with the n-th charge fraction a respective electromagnetic radiation emitter means for detecting overall dimensions of the charge exiting from the n-th loading station, and means for detecting an advancing speed of the charge exiting from the n-th loading station along the loading section;
   the processing and control unit being configured to determine a type and weight of the material of the n-th charge fraction to be loaded into the n-th charge station in function of the predetermined charge recipe and to estimate an advancing speed along the loading section and an arrival time of the charge exiting from the n-th loading station entering a possible further loading station of a further charge fraction or the preheating section.

6. The system according to claim 5, further comprising, upstream, with regard to the advancing direction of the continuous conveyor, of the n-th hopper, means for recognizing in the charge of material entering the n-th loading station the charge fractions discharged in the preceding loading stations by the respective identification means, means for detecting the actual overall dimensions of the charge of material entering the n-th loading station, and means for detecting the advancing speed of the charge of material entering the n-th loading station along the loading section,
   the processing and control unit configured to estimate, with respect to the charge entering the n-th loading station, the position at which to perform the discharging of n-th charge fraction, in function of the actual overall dimensions of the charge of material entering the n-th loading station and of the distribution of (n−1) charge fractions previously discharged onto the continuous conveyor, the arrival time of the estimated discharge position at the n-th loading station and for verifying the correspondence of the discharging position with n-th loading station.

7. The system according to claim 6, wherein the means for detecting overall dimensions comprises means for acquiring the profile of the charges at least on a transversal plane to the advancing direction of the continuous conveyor.

8. The system according to claim 6, wherein the marking means comprises means for associating with the first charge fraction and with each possible subsequent n-th charge fraction respective means for identifying the type of an emitter of electromagnetic radiations, the recognizing means comprising means for receiving the electromagnetic waves emitted from the respective emitter.

9. A control and tracking system of a charge of material transported by a continuous supply conveyor of a metallurgic furnace, or an electric furnace for production of steel, wherein the continuous conveyor includes, in sequence starting from its inlet end towards its outlet end, a loading section of the charge of material to be supplied to the furnace, a preheating section of the charge of material loaded, and an introduction section into the furnace of the preheated charge of material, and along the loading section at least a first loading station of the material, the system comprising:
   at the first loading station, at least one loading hopper referring to the continuous conveyor, means for detecting a weight of the material loaded in the hopper, means for marking a first charge fraction supplied into the hopper through identification means, means for detecting overall dimensions of the first charge fraction discharged onto the continuous conveyor, and means for detecting an advancing speed of the first charge fraction along the loading section of the continuous conveyor; and
   in proximity to the inlet to the preheating section, means for recognizing in the charge of material discharged onto the continuous conveyor of the first charge fraction and of possible further charge fractions subsequently discharged onto the continuous conveyor by the respective identifying means;
   a processing and control unit configured to determine a type and weight of the material of at least one first charge fraction to be loaded into the hopper of the first loading station in function of a predetermined charge recipe and to process the data detected by the means for detecting the weight, the overall dimensions and the speed and by the recognizing means, to estimate an actual position, an advancing speed along the loading section, and an arrival time of the first charge fraction entering a further possible loading station of a further charge fraction or the preheating section and the actual position, the advancing speed along the preheating section and the arrival time to the introducing section into the furnace of the first charge fraction and of possible further charge fractions subsequently discharged onto the continuous conveyor,
   further comprising means for detecting the overall dimensions and the means for detecting the speed, comprising means for acquiring images, or optical scanning means, radar, laser, of the charge of material present on the continuous conveyor,
   wherein the means for detecting the speed comprises means for acquiring a series of subsequent images of the charges in delayed times, the processing and control unit configured to correlate and process the images and the acquired temporal data to obtain an estimate of the advancing speed.

* * * * *